Jan. 9, 1934.     C. E. HOLDEN     1,943,269
CHRISTMAS TREE HOLDER
Filed Jan. 26, 1933
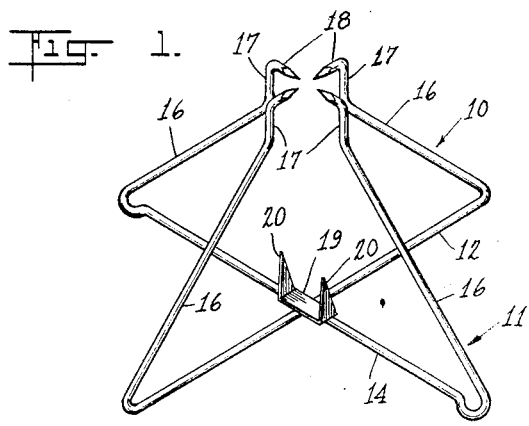
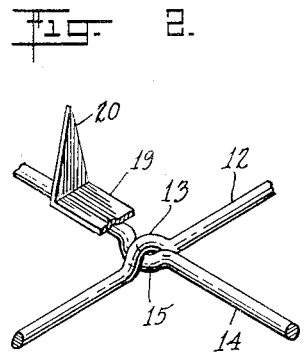
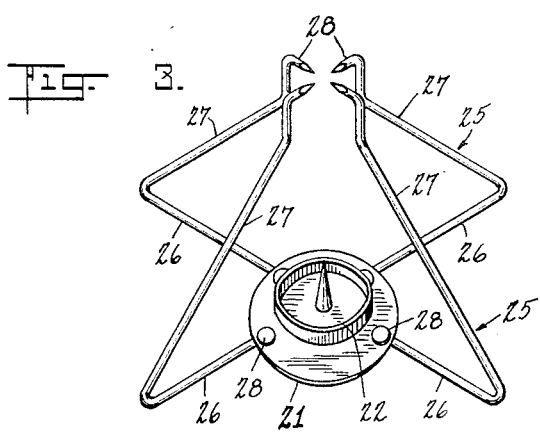
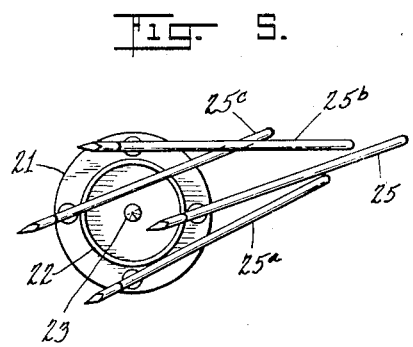
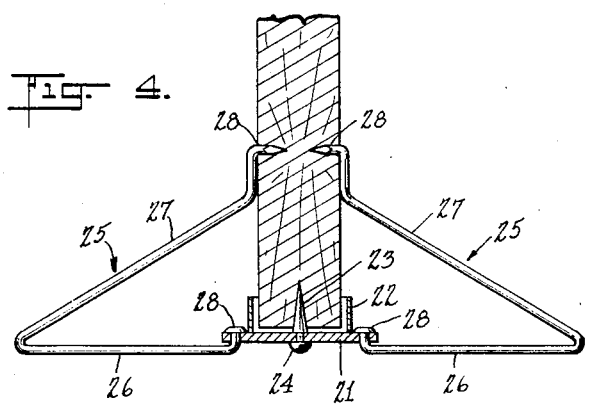
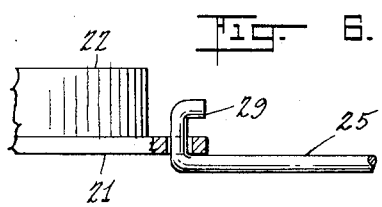
Charles E. Holden
INVENTOR
BY Maxwell F. Cargill
ATTORNEY Patented Jan. 9, 1934

1,943,269

UNITED STATES PATENT OFFICE 1,943,269

CHRISTMAS TREE HOLDER

Charles E. Holden, Chicago, Ill.

Application January 26, 1933. Serial No. 653,574

2 Claims. (Cl. 248—38)

This invention relates to improvements in Christmas tree holders.

One object of the invention is to provide an efficient tree holder which can be manufactured economically and of relatively few parts and to which a tree can be secured expeditiously and conveniently.

A further object of the invention is to provide a tree holder having braces or legs terminating in prongs or spikes which can be driven into the trunk of the tree, whereby the use of nails, screws, clamps and the like is eliminated.

Another object of the invention is to provide a tree holder, one embodiment of which comprises two sections which can be detached readily one from the other for convenience in handling, packing or storing.

A further object of the invention relates to the provision of a modified form of the invention which is provided with a water receptacle and supporting and bracing legs which can be folded, when not in use, into compact form.

Other objects relate to various features of construction and arrangement of parts which will be apparent from a consideration of the following specification and accompanying drawing, wherein Figure 1 is a perspective view of a Christmas tree holder, illustrating one form of the present improvements, Figure 2 is a broken view of the detail thereof, Figure 3 is a perspective view showing another modification of the improvements, Figure 4 is a broken elevation of the structure shown in Figure 3, and Figure 5 is a top plan view showing the brace members moved into compact relation for storage or packing, Figure 6 is a detail of a further modification of the holder.

In the drawing, the form of the invention illustrated in Figures 1 and 2, the holder comprises two detached sections indicated generally by the numerals 10 and 11.

The section 10 has a horizontal portion 12 provided with an upwardly extending offset central portion 13. The member 11 has a horizontal portion 14 having a downwardly directed offset central portion 15. The members 12 and 14 are designed to rest on the floor, and each is provided at its outer ends with braces 16 which are directed inwardly and upwardly.

The free ends of the brace member 16 are preferably provided with short substantially vertical sections 17 which terminate in horizontally disposed prongs or spikes 18 which are adapted to be driven into the trunk of a tree.

A spike carrying member 19 spans the recess portion 15 of the section 14, and in the form shown is provided with two upwardly projecting spurs or spikes 20, adapted to be pressed into the butt end of the tree.

The provision of the complementary offset portions 13 and 15 provides a joint which enables the two members 10 and 11 to be detached for convenience in storage or shipment, and when connected together in the position shown in Figures 1 and 2, prevents movement of one of the said members longitudinally of the other.

The member 19 is preferably welded to the portion 14 although it may be otherwise secured thereto.

In use, the butt end of a tree is pressed downwardly upon the spurs 20 and thereafter the spikes 18 are driven into the trunk of the tree. This construction supports the tree rigidly and the arrangement obviates the use of screws, nails, clamps and other attaching devices, frequently employed.

When the tree has been removed by first pulling out the spurs or spikes 18, the sections 10 and 11 can be disconnected readily by turning one of the members through an arc of 90° from the normal position and sliding it lengthwise with reference to the other. The members can then be laid away for further use, and require very little storage space.

The tree holder may be packed for sale in dissassembled condition and packed conveniently in a paper envelope, or the like.

The holder shown in Figures 1 and 2 is preferably formed of wire, each section being formed of a single piece.

It will be seen that the holder can be manufactured for a very few cents, as the construction is simple, and the materials of which it is made are relatively cheap.

In the form shown in Figures 3, 4 and 5, a disk 21 is provided carrying a cup member 22 for receiving water. A spur 23 is provided centrally of the cup and may have its lower end riveted over as at 24, as shown in Figure 4.

The spur 23 is designed to be pressed into the butt end of the Christmas tree similar to the spurs 20 of the above described modification.

Secured to the disk 21 are four members indicated generally by the numeral 25, each of which comprises a horizontal portion 26 and an upwardly and inwardly extending brace 27 terminating at its upper end in a spike 28. The members 25 are shown as having their ends passed upwardly through openings in the disk 21 and having their ends riveted over as at 28. This form of holder is used in the same manner as is the form shown in Figures 1 and 2, but the provision of the cup or receptacle 23 enables the user to keep the bottom end of the tree immersed in water to reduce the shedding of the needles.

While the form shown in Figures 3 and 4 is not as compact as the first described modification, the members 25 can be swung around to the positions shown in Figure 5, whereby a less bulky and cumbersome arrangement is provided for the purpose of storage or packaging. Thus, in Figure 5, one of the four arms 25 is shown extended outwardly from the disk 21 but at a slight angle to the normal radial plane of the arms.

The next adjacent arms 25a and 25b are then swung around into contact with the arm 25, and thereafter the arm 25c can be swung around to the position shown, this arm being sprung downwardly slightly so that the horizontal portion 26 thereof slides under the corresponding portion of the arm 25b.

This arrangement of the arm enables the device to be packed in a less bulky package, since, if desired, the braces 27 can be pressed downwardly into contact with the cup 22.

If desired, instead of riveting over the ends 28 of the members 25, such ends may be extended horizontally a short distance to provide hook members 29 whereby the members 25 can be detached readily from the disk 21 and packed in a relatively flat package. This modification is shown in Figure 6.

While I have shown and described certain embodiments of my invention for the purpose of illustration, I do not wish to be restricted specifically thereto except as so limited by the appended claims.

I claim:

1. A tree holder comprising a pair of separable wire forms having horizontal sections adapted to rest on the floor, one of said sections having a central offset for receiving the other form, a member fixed to said last mentioned section and bridging said offset for defining therewith a passage through which said other form may be passed lengthwise in assembling said forms in operative position, said bridging member being provided with a vertical spur adapted to be driven into the butt end of a tree, the ends of said sections being provided with upwardly and inwardly extending braces terminating in substantially horizontal spurs adapted to be driven into the trunk of the tree.

2. A tree holder comprising a pair of detachable sections each having a base and two upwardly and inwardly extending arms terminating in spurs adapted to be driven into the trunk of the tree, a member centrally secured to one of said bases and defining therewith a passage through which said other section may be passed lengthwise in assembling said sections in operative position, said other section having an offset portion cooperating with the remaining section within said passage to prevent relative lateral movement of said sections, and a spur carried by said member and adapted to be driven into the butt end of the tree.

CHARLES E. HOLDEN.